United States Patent [19]

Pleune et al.

[11] Patent Number: 5,532,767
[45] Date of Patent: Jul. 2, 1996

[54] PANTOSCOPIC AND LENGTH ADJUSTABLE SAFETY SPECTACLE

[75] Inventors: Daniel A. Pleune, Rockford; William E. Roe, Wayland, both of Mich.

[73] Assignee: Jackson Products, Inc., Belmont, Mich.

[21] Appl. No.: 504,371

[22] Filed: Jul. 19, 1995

[51] Int. Cl.⁶ .............................. G02C 5/20; G02C 5/14
[52] U.S. Cl. .......................... 351/118; 351/119; 351/120
[58] Field of Search .................................. 351/118, 119, 351/120, 111, 123, 115, 41, 83, 85, 86, 89, 138, 136, 153; 2/453, 448, 431, 449, 426; 128/228

[56] References Cited

U.S. PATENT DOCUMENTS

| | | | |
|---|---|---|---|
| 1,252,126 | 1/1918 | Letzeisen . | |
| 2,080,503 | 5/1937 | Petersen | 88/53 |
| 3,189,912 | 6/1965 | Miller | 351/118 |
| 3,271,094 | 9/1966 | Wildermuth | 351/120 |
| 3,667,834 | 6/1972 | Davison et al. | 351/118 |
| 4,071,165 | 4/1977 | Davis | 351/153 |
| 4,527,291 | 7/1985 | Nussbickl | 2/450 |
| 4,544,245 | 10/1985 | Stansbury, Jr. | 351/120 |
| 4,792,221 | 12/1988 | Parks et al. | 351/118 |
| 5,016,292 | 5/1991 | Rademacher | 2/431 |
| 5,289,592 | 4/1994 | Paivarinta | 2/431 |
| 5,381,192 | 11/1995 | Canavan et al. | 351/118 |

*Primary Examiner*—Hung Dang
*Attorney, Agent, or Firm*—Edward H. Renner

[57] ABSTRACT

A safety spectacle providing front and lateral impact protection. The spectacle includes a frame, a removable lens incorporating integrated upper and lower side shields connected to the frame by means of a nose bridge, and a pair of length and pantoscopic adjustable temples arm assemblies hingedly connected to the sides of the frames. The temple arm assemblies are adjustable lengthwise by earpieces which can be locked and unlocked into slots on an intermediate arm receptacle by means of a quarter turn barrel configuration. The temples are adjustable pantoscopically by means of a pair of semicircular arms, both of which are hinged at the front to the side of the frame between a pair of outward sloping walls and inserted at the rear into a threaded ferrule. One arm is threaded inside the ferrule and allowed to move in and out when the ferrule is rotated while the mating semicircular arm is stationary, thereby varying the angle of the temple within the sloped walls and thus the frame.

14 Claims, 3 Drawing Sheets

PANTOSCOPIC AND LENGTH ADJUSTABLE SAFETY SPECTACLE

BACKGROUND OF THE INVENTION

1. Field of the Invention

The present invention relates to safety spectacles, and more particularly to adjustable safety spectacles that include both fore/aft (length) and pantoscopic (lens angle to frame) adjustment mechanisms.

2. Description of Related Art

Because of various safety requirements for employees coupled with a more safety conscious public, the need for safety gear has increased. With this need has come the requirement that the safety equipment must be functional, practical and comfortable. One piece of safety equipment is the spectacle for protecting the eyes.

The prior art discloses many different types of glasses or spectacles with features such as temples having various length and/or pantoscopic adjustment mechanisms. The typical design for adjustable spectacles employs screw means to adjust and maintain the positions of the temples with respect to the frames, as characterized by U.S. Pat. No. 1,252,126 Letzeisen. One shortcoming of utilizing screw means is that it increases the cost of production because of the additional parts and labor required for drilling and assembly.

Numerous attempts have been made to improve the structures and designs of adjustable spectacles in order to make them more comfortable for the user. Most notably, U.S. Pat. No. 5,016,292 Rademacher teaches a safety spectacle with length adjustable temples in which knobs on an earpiece can be inserted into a plurality of different holes of a notched region on a telescoping connection. Even though no screw means are employed in the entire spectacle design, the spectacle also does not provide a pantoscopic adjustment mechanism.

A pantoscopic and length adjustable spectacle which does not employ screw means is taught by U.S. Pat. No. 5,289,592 Paivarinta. This patent discloses an eyeglass holder having a pawl and ratchet adjustment mechanism for adjusting the length of the temples, and an arcuate pawl and ratchet adjustment mechanism member for changing the angle of the arms relative to the frame. The spectacle, however, has a design requiring many different parts, including a hinge and pin connection of the temple piece to the frame. Some of the parts are very intricate and thereby expensive to produce. Furthermore, the spectacle does not provide adequately secure locking mechanisms to maintain the positioning of the temples once adjusted.

With the above considerations in mind, an object of the present invention is to provide a safety spectacle with both a length and pantoscopic adjustable temple arm assembly which can be easily constructed with a minimal number of parts and without drilling or screws required for assembly.

Another object of the present invention is to provide a safety spectacle having easily adjustable length and pantoscopic temples.

A further object of the present invention is to provide an easily disassemblable safety spectacle in order to quickly change lenses.

SUMMARY OF THE INVENTION

The present invention is a safety spectacle to be used as a primary eye protector providing both front and lateral impact protection having length and pantoscopic adjustment mechanisms.

The spectacle includes a unitary lens having a six-base curve design providing in excess of 180 degrees coverage in conjunction with integrated side shields.

The frame comprises a removable T-bar nose bridge that fastens the lens to a one-piece top frame. The sides of the frame terminate in socketed attachment brackets that serve as hinge or pivot points for respective temple arm assemblies. Balls on two arm plates at the ends of the temple arm assemblies hingedly attach the arm assemblies to the frame, thereby defining ball and socket hinging. The temple arm assemblies include both the length and pantoscopic adjustment mechanisms.

Length adjustment is accomplished by locking and unlocking a tab on the forked end of a curved earpiece into an earpiece receptacle by rotating the earpiece a quarter turn which allows the wearer to set the tab into one of five positions through a five slot configuration. In this manner, the length of the temple arm assemblies may be independently varied.

Pantoscopic adjustment is accomplished by the repositioning of the two arm plates with respect to one another. Each temple arm assembly includes an independent pantoscopic adjustment assembly. Both arm plates are held stationary to the point of attachment to the brackets on the sides of the frame at one end, and to an internally threaded ferrule at the other end. The two arm plates are slidably mounted to one another by means of a rail on the back of one arm plate which runs along the conforming channel of the other arm plate. The channelled arm plate has a threaded base which is allowed to move in and out of the ferrule upon rotation of the ferrule, thereby varying the angle of the temple arm assembly with respect to the frame.

BRIEF DESCRIPTION OF THE DRAWINGS

The above-mentioned and other features, advantages and objects of this invention, and the manner in which they are attained, will become more apparent and will be best understood by reference to the detailed description read in conjunction with the accompanying drawings which follow, wherein.

DESCRIPTION OF THE PREFERRED EMBODIMENT

Figure 1:
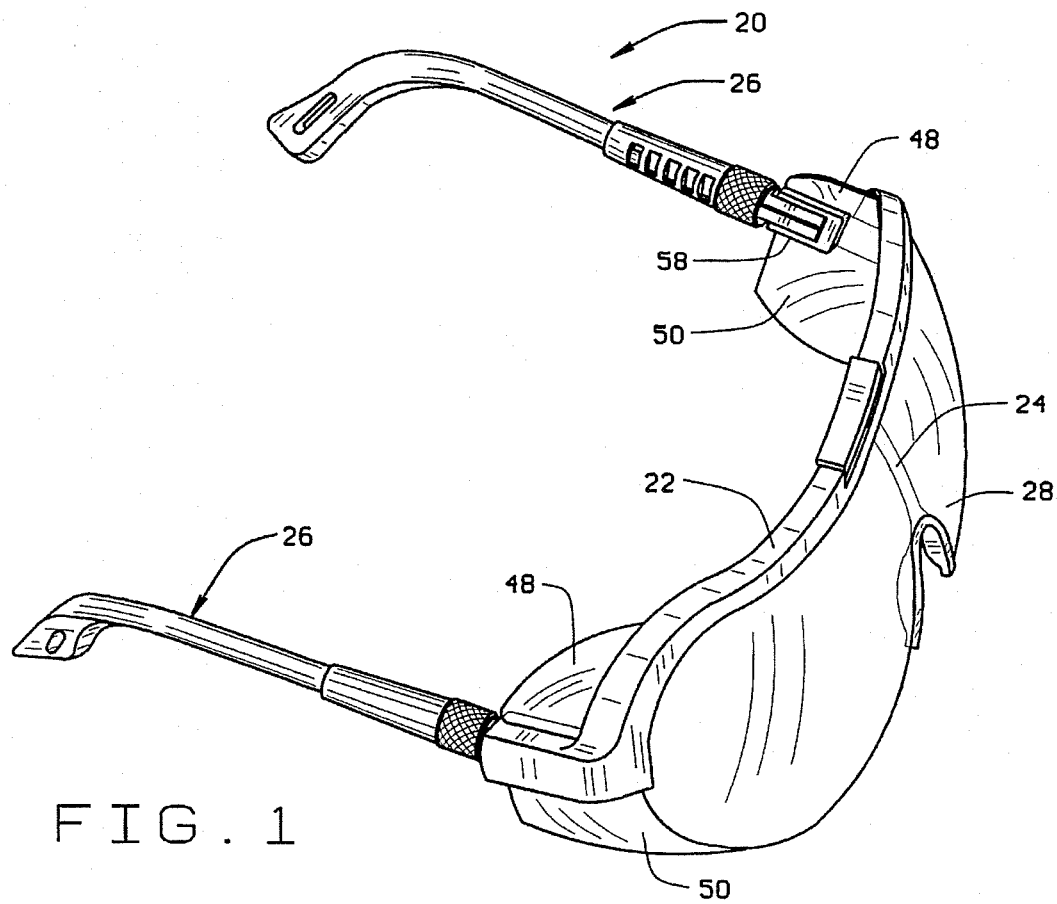
FIG. 1 is a perspective view of the safety spectacle of the present invention.
Figure 11:
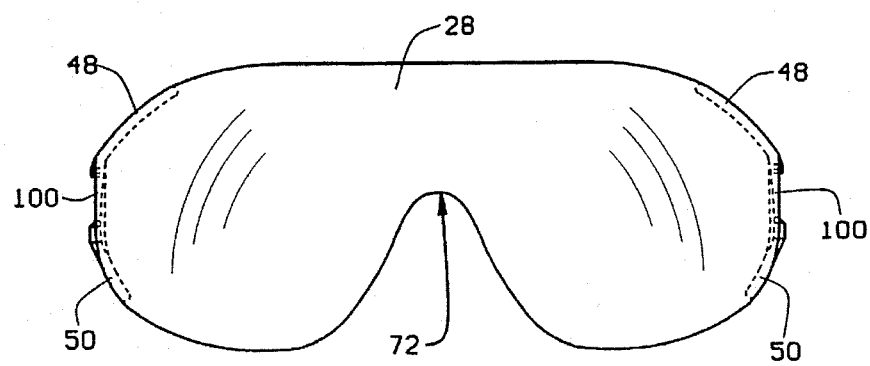
FIG. 11 is a front elevational view of the lens of the present invention.

Referring to FIG. 1, a safety spectacle 20 is shown generally having a frame 22, a pair of temple arm assemblies 26, and a lens 28. The lens 28, shown in FIG. 11, comprises a unitary, one-piece, six-base curve design having integrated upper side shields 48 and lower side shields 50 separated by a rectangular shaped recess 100, the upper and lower side shields 48 and 50 and rectangular shaped recess 100 being illustrated by broken lines. Located centrally on the bottom of the lens 28 is an arched portion 72 shaped to conform to a wearer's nose. The lens construction and design provide in excess of 180 degrees coverage to the wearer. The lens 28 is designed to meet A.N.S.I. standard Z87.1-1989 and is thus formed of a polycarbonate having a wall thickness of 0.080".

Figure 12:
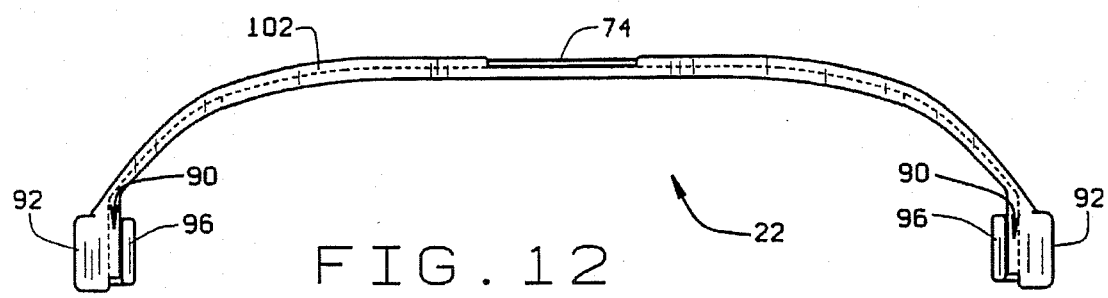
FIG. 12 is an enlarged front elevational view of the frame of the present invention.
Figure 13:
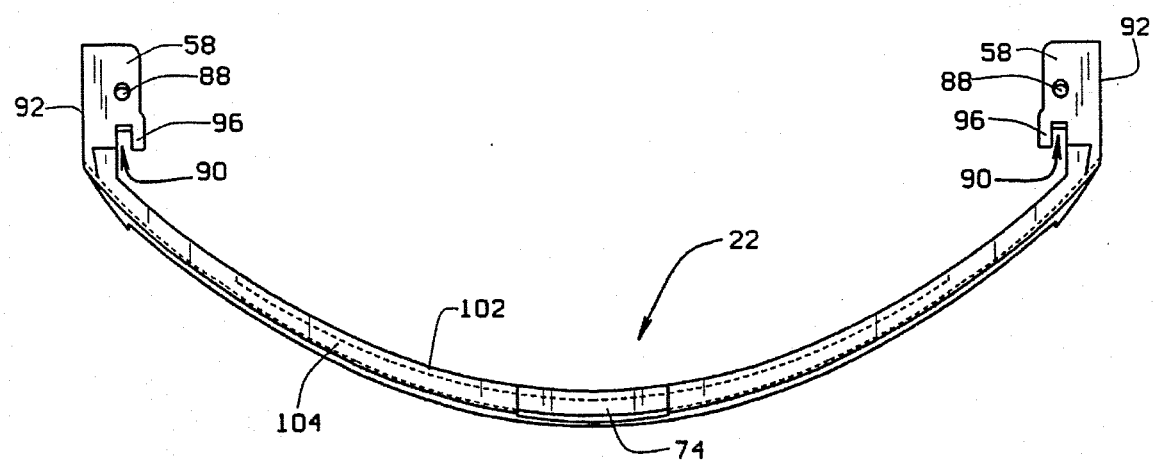
FIG. 13 is an enlarged top elevational view of the frame of FIG. 12.
Figure 14:
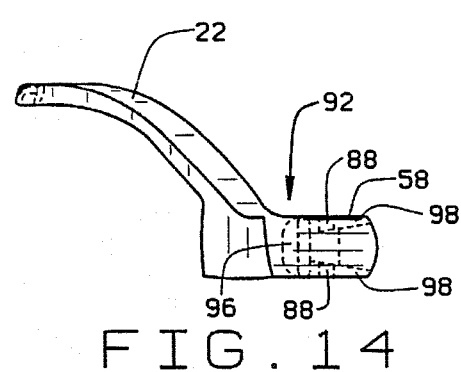
FIG. 14 an enlarged fragmentary side cutaway view of the frame of the present invention, showing in broken lines the attachment bracket.

The frame 22 is shown in FIGS. 12–14. The frame 22 generally comprises two sides 92 and a rim 102, that are formed of a plastic and preferably of a nylon. The rim 102 has a lens receiving portion 104 defining a groove or channel on its bottom side, as outlined by broken lines in FIG. 13, and a centrally located notch 74 on its top side. As best illustrated by broken lines in FIG. 14, each of the sides 92 of the frame 22 includes an attachment or pivot bracket 58 defined by a projecting appendage 96 and adjacent sockets 88 positioned on outwardly extending sloped bracket arms 98. The attachment brackets 58 are approximately the same length and width of the rectangular shaped recess 100 of the lens 28 such that the recess 100 may receive the attachment brackets 58. As best seen in FIG. 13, cavities 90 are formed between the appendages 96 of the attachment brackets 58 and the sides 92 of the frame 22. The cavities 90 in conjunction with the appendages 96 help hold the lens 28 in place within the frame 22.

Figure 10:
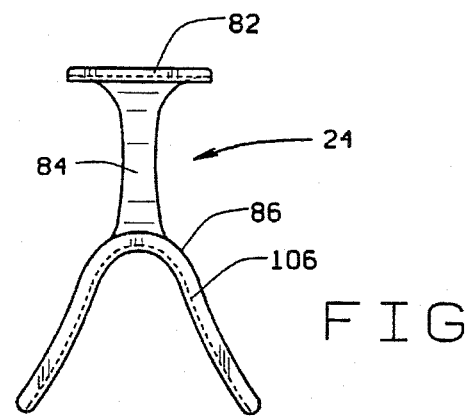
FIG. 10 is an enlarged front elevational view of the nose bridge of the present invention.

To attach the lens 28 to the frame 22, the lens 28 is inserted into the lens receiving portion 104 of the rim 102. The rectangular shaped recesses 100 are placed over the attachment brackets 58 and inserted into the cavities 90 to fasten the lens 28 to the sides 92 of the frame 22. The lens 28 is then secured to the rim 102 of the frame 22 by means of a T-bar nose bridge 24. The nose bridge 24, best seen in FIG. 10, has a clasp 82 and a nose rest 86 connected by a vertical column 84. The nose rest 86 has a shape corresponding to that of the arched portion 72 of the lens 28 and includes a lens receiving portion or groove 106 on its top side as outlined and indicated by broken lines. The T-bar nose bridge 24 is likewise formed of a plastic, preferably nylon. The lens 28 is inserted into the lens receiving portion 106 of the nose rest 86, with the vertical column 84 extending up the back of the lens. The clasp 82 is received or clamped onto the groove 74 of the rim 102.

Figure 2:
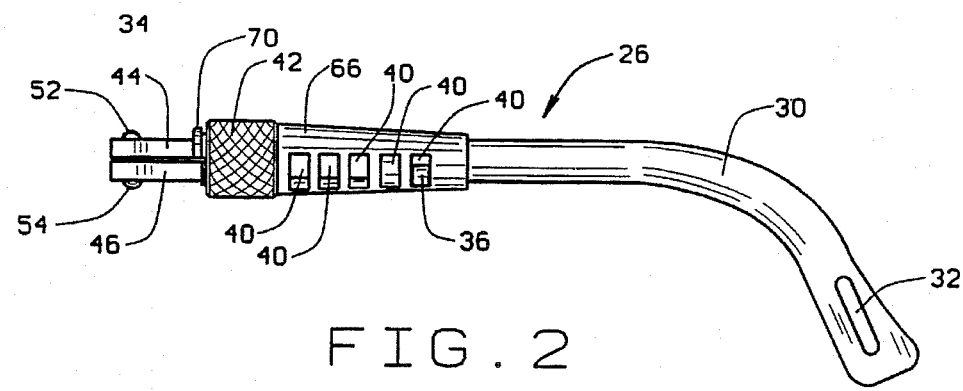
FIG. 2 is an enlarged side view of one of the temple arm assemblies of the present invention.
Figure 6:
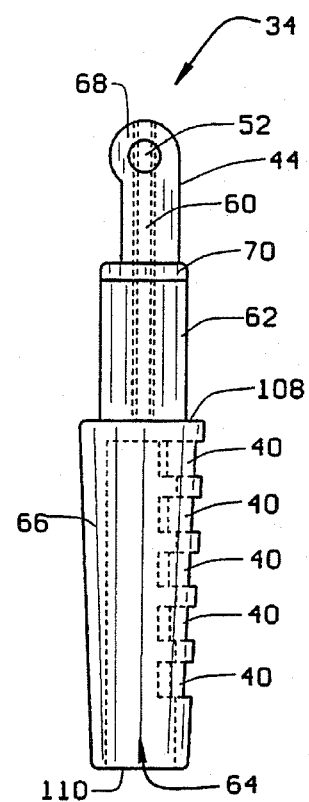
FIG. 6 is an enlarged rear elevational view of the attachment assembly of FIG. 4.
Figure 9:
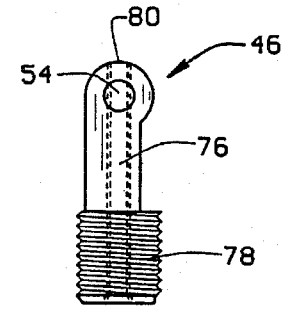
FIG. 9 is an enlarged front elevational view of the lower arm plate of FIG. 7.

One of the two temple arm assemblies 26 is shown in FIG. 2. Each temple arm assembly 26 generally comprises an earpiece 30 and an attachment assembly 34. The attachment assembly 34 includes an upper arm plate 44 and a lower arm plate 46 extending from one end of the attachment assembly 34. The upper and lower arm plates 44, 46 have semicircular knobs 52 and 54, respectively, centered on respective curved upper portions 68 and 80, as best shown in FIGS. 6 and 9. The knobs 52 and 54 hinge or pivot the temple arm assemblies 26 to the sides 92 of the frame 22 by insertion into the sockets 88 of the attachment brackets 58.

Figure 4:
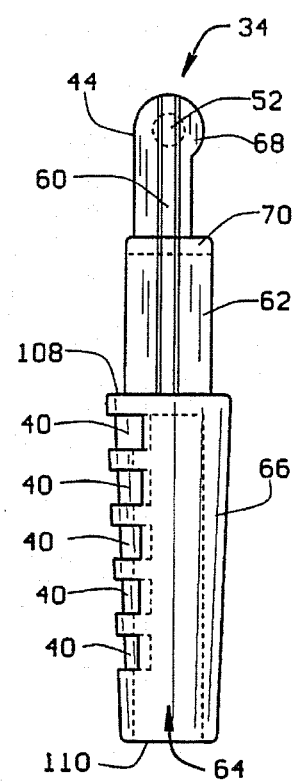
FIG. 4 is an enlarged front elevational view of the attachment assembly of the temple arm assembly of FIG. 2.
Figure 5:
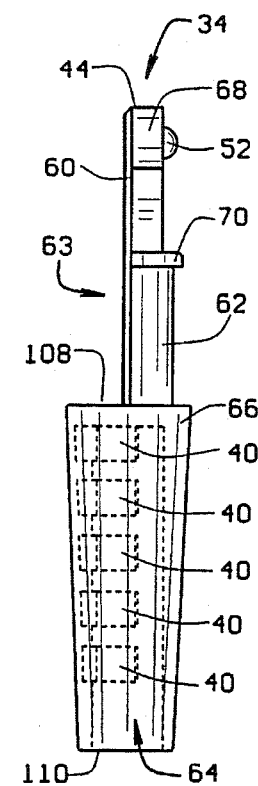
FIG. 5 is an enlarged side elevational view of the attachment assembly of FIG. 4.

As illustrated in FIGS. 4–6, the attachment assembly 34 includes a truncated cone or frusto-conical shaped earpiece receptacle 66 having a solid larger-diametered base 108 and a smaller-diametered open end 110 leading to a longitudinal internal channel 64. Five evenly-spaced rectangular slots or openings 40, of the same size are disposed along the receptacle 66 from the open end 110 to the base 108 which are in communication with the channel 64. Because of the frusto-conical shape of the receptacle, the external openings of the slots 40 are larger towards the base 108 than towards the open end 110. However, the internal dimensions of the slots 40 as they communicate with the channel 64 are the same size.

Extending from the base 108 of the earpiece receptacle 66 is a semicircular stem 62 of substantially equivalent diameter as the open end 110 of the earpiece receptacle 66. As best depicted in FIG. 5, the flat portion 63 of the stem 62 is positioned along the diameter of the base 108 angularly with respect to the slots 40. The upper arm plate 44 extends from an outward projection or rim 70 on the top of the stem 26. As shown in FIG. 4, a vertical convex rail 60 runs across the entire longitudinal length of the backs of the upper arm plate 44 and stem 62. As described hereinbelow, the rail 60 serves as a guide or track for the lower arm plate 46.

Figure 15:
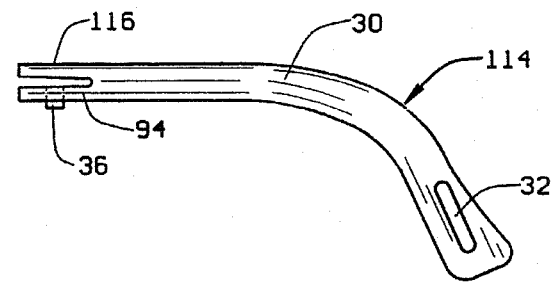
FIG. 15 is a side elevational view of the earpiece of the temple arm assembly of FIG. 2.

The earpiece 30, shown generally in FIG. 15, has a curved end 114 which is adapted to extend around the ear of the wearer, and a forked end defining a pair of prongs 94 and 116. The diameter of the rounded portion of the earpiece 30 is approximately equal to the diameter of the channel 64 of the earpiece receptacle 66. Prong 94 includes an essentially rectangular projecting tab 36 disposed a distance from the end thereof. The curved end 114 of the earpiece 30 includes a slot 32 which may be connected by an elastic or other flexible material band to the other curved end 114 of the other earpiece 30 to secure the safety spectacle 20 to the head of the wearer.

To attach the earpiece 30 to the earpiece receptacle 66, the earpiece 30 is inserted into the channel 64 of the earpiece receptacle 66 and the tab 36 is locked into one of the five adjacent slots 40 on the earpiece receptacle 66. The prongs 94 and 116 and tab 36 of the earpiece 30 in conjunction with the slots 40 on the earpiece receptacle 66 forms a quarter turn barrel configuration. The quarter turn barrel configuration allows the wearer to rotate the earpiece 30 ninety degrees in one direction to unlock the tab 36, then position the earpiece 30 at a desired length, and finally rotate the earpiece 30 back ninety degrees to lock the tab 36 into a different slot 40, thereby varying the length of the temple arm assembly 26.

Figure 7:
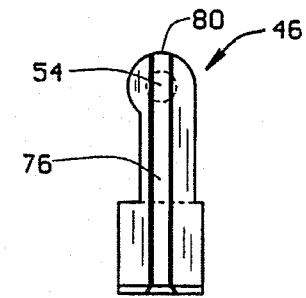
FIG. 7 is an enlarged rear elevational view of the lower arm plate of the temple arm assembly of FIG. 2.
Figure 8:
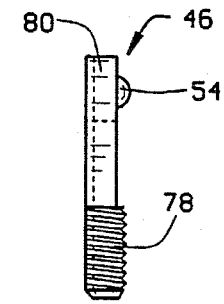
FIG. 8 is an enlarged side elevational view of the lower arm plate of FIG. 7.

Referring to FIGS. 7–9, the lower arm plate 46 of the temple arm assembly 26 is shown having a curved upper portion 80, a threaded base 78, and a vertical concave channel 76. The concave channel or groove 76 traverses the entire longitudinal length of the back side of the lower arm plate 46. The threaded base 78 extends only around the front and sides of the lower arm plate 46, as best depicted in FIGS. 8 and 9. The concave channel 76 of the lower arm plate 46 conforms to the convex rail 60 of the upper arm plate 44, thereby slidably mounting the lower arm plate 46 to the upper arm plate 44.

Figure 3:
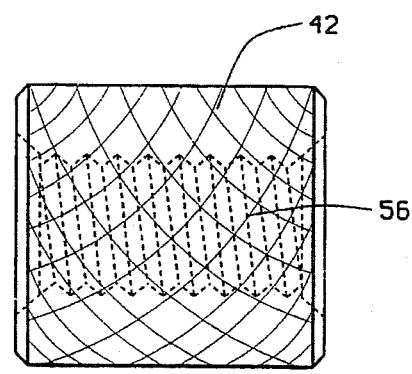
FIG. 3 is an enlarged side view of the ferrule of the temple arm assembly of FIG. 2.

Referring to FIG. 2, a ferrule 42 is disposed on the arm assembly 26, specifically about the stem 62 of the upper arm plate 44 of the attachment assembly 34. Additionally, the ferrule 42 surrounds and operatively attaches the lower arm plate 46 to the upper arm plate 44 to complete the attachment assembly 34. The ferrule 42, as depicted in FIG. 3, has an internally threaded channel 56 and is made from a plastic, preferably an acetal resin such as Delrin® and threadedly secures the stem 62 of the attachment assembly 34 to the threaded base 78 of the lower arm plate 46.

Pantoscopic adjustment is accomplished by repositioning the lower arm plate 46 with respect to the upper arm plate 44. This is accomplished by rotating the ferrule 42. Upon rotation of the ferrule 42, the lower arm plate 46 moves in and out of the ferrule 42 and along the convex rail 60 of the upper arm plate 44. Because the knobs 52 and 54 of the upper and lower arm plates 44 and 46 respectively, are removably fixed in the sockets 88 of the bracket 58, movement of the lower arm plate 46 relative to the upper arm plate 44 causes a tilting or angling of the arm assembly 26, thereby varying the angle of the temple arm assembly 26 between the sloped bracket arms 98 with respect to the frame 22. The maximum angular variation is defined by the angles of the slopes of the walls of the sloped bracket arms 98. When the ferrule 42 is rotated clockwise, the angle of the temple arm assembly decreases with respect to the frame 22, and when the ferrule is rotated counterclockwise, the angle of the temple arm assembly 26 increases with respect to the frame 22.

Accordingly, while this invention is described with reference to a preferred embodiment of the invention, it is not intended to be construed in a limiting sense. It is rather intended to cover any variations, uses or adaptations in the invention utilizing its general principles. Various modifications will be apparent to persons skilled in the art upon reference to this description. It is therefore contemplated that the appended claims will cover any such modifications or embodiments as fall within the true scope of the invention.

What is claimed is:

1. An adjustable safety spectacle, comprising:
    a) a lens having an upper shield and a lower shield disposed on each side of said lens;
    b) a frame receiving said lens, said frame having an upper rim and two side members, each of said side members having a bracket with an inwardly facing channel having a pair of sockets located on upper and lower sides of said bracket;
    c) a nose bridge that clampingly retains said upper rim of said frame to said lens;
    d) a first and second temple arm assembly, each temple arm assembly having an earpiece member with a pair of prongs extending from one end, one of said prongs having a tab, each said temple arm assembly further comprising an attachment assembly having an earpiece receptacle including a solid base end and an open end leading to a channel in communication with a plurality of slots for insertion of said tab of said earpiece member and adjusting the length of said temple arm assembly by rotating said earpiece member within said earpiece receptacle and positioning said tab in one of said slots, said attachment assembly further having an upper arm plate member extending from said base of said earpiece receptacle having a knob at the top end for insertion into said socket on the upper side of said bracket said upper arm plate member further including a protruding vertical rail extending along the back surface of said upper arm plate member and a lower arm plate member having a threaded base extending around the front and sides of said lower arm plate member and further including a vertical depression on the back surface of said lower arm plate member for slidably mounting said rail of said upper arm plate member, said lower arm plate member further including a knob at the top end for insertion into said socket on the lower side of said bracket, thereby hinging said temple arm assembly with respect to said frame; and
    e) a ferrule having an internally threaded channel for securing the bottom end of said upper arm plate member to the bottom end of said lower arm plate member, the bottom end of said lower arm plate member threaded into said channel of said ferrule for extending and retracting said lower arm plate member along said rail of said upper arm plate member while said temple assembly remains hinged to said bracket when rotating said ferrule, thereby adjusting the angle of said temple assembly with respect to said frame.

2. The adjustable safety spectacle of claim 1, wherein each of said brackets of said frame comprise:
    a) a pair of outwardly extending curved side rails for angularly positioning said temple arm assemblies with respect to said frame while extending and retracting said lower arm plate member along said rail of said upper arm plate member; and
    b) a projecting arm forming a cavity between said bracket and said side of said frame.

3. The adjustable safety spectacle of claim 2, wherein said lens further comprises substantially bracket shaped recesses situated between said upper shields and said lower shields for securing said lens to said bracket by inserting said lens into said cavity between said bracket and said side of said frame.

4. The adjustable safety spectacle of claim 1, wherein said nose bridge comprises:
    a) a clamping bracket that extends about said upper rim of said frame;
    b) a nose rest portion having a slit comprising a pair of side walls separated by a channel for installation of said lens into said slit of said nose rest portion; and
    c) a vertical column connecting said clamping bracket and said nose rest portion.

5. The adjustable safety spectacle of claim 1, wherein said earpiece receptacle is a truncated cone shape, whereby each of said slots of said earpiece receptacle defines a predetermined width, thereby creating a quarter-turn barrel configuration.

6. The adjustable safety spectacle of claim 5, wherein the number of said slots is five.

7. The adjustable safety spectacle of claim 1, wherein the bottom end of said upper arm plate is a stem having a semicircular projecting member located between said upper arm plate and said earpiece receptacle.

8. A temple length and lens adjustable safety spectacle comprising:
    a) a one-piece lens having a front face with integral upper and lower transverse shields on each side thereof with an inset portion between each said upper and lower shields, and a nose notch on said front face;
    b) a one-piece unitary frame defined by an upper rim and left and right side members, said upper rim having a groove disposed along a bottom edge thereof for receipt of an upper edge of said front face, said left and right side members each having a channel therein and adapted to be received in said inset portions wherein an end of said inset portion is maintained in said channel, each said side member further including a bracket defined by an opening having upwardly and outwardly tapering upper and lower walls transverse to said front face, and an upper and lower socket respectively disposed in said upper and lower walls;

c) a detachable nose bridge extending from said nose notch of said lens to said upper rim, said nose bridge releasably retaining said lens to said upper rim; and d) a left and right temple arm assembly, each temple arm assembly having an earpiece member with a pair of prongs extending from one end, one of said prongs having a tab, each said temple arm assembly further including an earpiece member attachment assembly having an earpiece receptacle including a base end and an open end leading to a channel in communication with a plurality of slots for insertion of said tab of said earpiece member and adjusting the length of said temple arm assembly by rotating and extending or retracting said earpiece member within said earpiece receptacle and positioning said tab in alternate slots, said attachment assembly further having an upper arm plate member extending from said base of said earpiece receptacle having a knob at the top end for insertion into said socket on the upper side of said bracket, said upper arm plate member further including a protruding rail extending along a back surface of said upper arm plate member, and a lower arm plate member having a threaded base extending around the front and sides of said lower arm plate member and further including a channel on the back surface of said lower arm plate member that receives said rail for slidably mounting said rail of said upper arm plate member onto said lower arm plate member, said lower arm plate member further including a knob at the top end for insertion into said socket on the lower side of said bracket, thereby along with said knob of said upper arm plate member and said socket on said upper side of said bracket hinging said temple arm assembly with respect to said frame.

9. The safety spectacle of claim 8, wherein said lens is formed of a polycarbonate, said rim, nose bridge and arm assemblies are formed of a nylon.

10. The safety spectacle of claim 8; wherein said nose bridge comprises:

a) a clamping bracket that extends about said upper rim of said frame;

b) a nose rest portion having a slit comprising a pair of side walls separated by a channel for installation of said lens into said slit of said nose rest portion; and c) a vertical column connecting said clamping bracket and said nose rest portion.

11. A temple arm assembly for spectacles, the temple arm assembly comprising:

a) a pair of end brackets adapted to be coupled to opposite sides of the spectacles, each said end bracket having upper and lower skew walls defining an axially outwardly extending angle, an upper socket disposed in said upper wall, and a lower socket disposed in said lower wall;

b) an earpiece member having a first end adapted to be received about an ear of the user, and a second end defined by a pair of separated prongs, one of said prongs including a tab;

c) a frusto-conical body having a first end in communication with an internal bore, and a second end terminating in a first pivot arm, said body including a plurality of slots in communication with said internal bore and adapted to receive said tab, said first pivot arm having a stop intermediately disposed thereon, a first knob at an end opposite said second end of said body, and a longitudinal rail disposed on a side opposite said first knob;

d) a second pivot arm having a second knob at one end, a threaded portion at another end, and a longitudinal groove on a side opposite said second knob, said second pivot arm disposed adjacent said first pivot arm such that said rail of said first pivot arm is received in said groove of said second pivot arm whereby said second pivot arm is longitudinally slidably disposed thereon, said threaded portion being disposed adjacent said second end of said body; and e) an internally threaded ferrule radially disposed about said threaded portion of said second pivot arm and said first pivot arm, whereby rotation of said ferrule causes said second pivot arm to longitudinally reciprocate causing the temple arm assembly to angle with respect to said bracket.

12. The temple arm assembly of claim 11, wherein said tab is rectangular.

13. The temple arm assembly of claim 11, wherein said plurality of slots equals five.

14. The temple arm assembly of claim 11, wherein said earpiece member, said body, and said first and second pivot arms are formed of a nylon, and said ferrule is formed of an acetal.

* * * * *